United States Patent
Jang

(10) Patent No.: US 8,179,374 B2
(45) Date of Patent: May 15, 2012

(54) TOUCH SENSING DEVICE AND METHOD FOR CORRECTING OUTPUT THEREOF

(75) Inventor: Suhyak Jang, Daegu (KR)

(73) Assignee: LG Display Co., Ltd., Seoul (KR)

(*) Notice: Subject to any disclaimer, the term of this patent is extended or adjusted under 35 U.S.C. 154(b) by 737 days.

(21) Appl. No.: 12/318,319

(22) Filed: Dec. 24, 2008

(65) Prior Publication Data

US 2010/0090967 A1    Apr. 15, 2010

(30) Foreign Application Priority Data

Oct. 10, 2008  (KR) .................. 10-2008-0099708

(51) Int. Cl.
*G06F 3/041* (2006.01)
(52) U.S. Cl. ...................................... 345/173; 345/156
(58) Field of Classification Search .................. 345/156, 345/173–175, 177; 178/18.01–18.07, 19.01–19.05
See application file for complete search history.

(56) References Cited

U.S. PATENT DOCUMENTS

| | | | | |
|---|---|---|---|---|
| 6,670,944 B1* | 12/2003 | Ishii | | 345/100 |
| 2008/0143682 A1* | 6/2008 | Shim et al. | | 345/173 |
| 2008/0158198 A1* | 7/2008 | Elias | | 345/174 |
| 2008/0252608 A1* | 10/2008 | Geaghan | | 345/173 |
| 2008/0263445 A1* | 10/2008 | Park | | 715/702 |
| 2009/0066674 A1* | 3/2009 | Maharyta et al. | | 345/178 |
| 2009/0273570 A1* | 11/2009 | Degner et al. | | 345/173 |

FOREIGN PATENT DOCUMENTS

JP    10-020992    1/1998

* cited by examiner

*Primary Examiner* — Ricardo L Osorio
(74) *Attorney, Agent, or Firm* — McKenna, Long and Aldridge, LLP.

(57) ABSTRACT

A touch sensing device for increasing the sensitivity of a touch sensor is disclosed. The touch sensing device comprises: a touch sensor array including a plurality of touch sensors; and a swing level correction unit for correcting each of touch data from the touch sensor array by a difference value with neighboring another touch data to generate correction values and correcting the swing levels of the touch data by adding an offset value to the correction values.

12 Claims, 12 Drawing Sheets

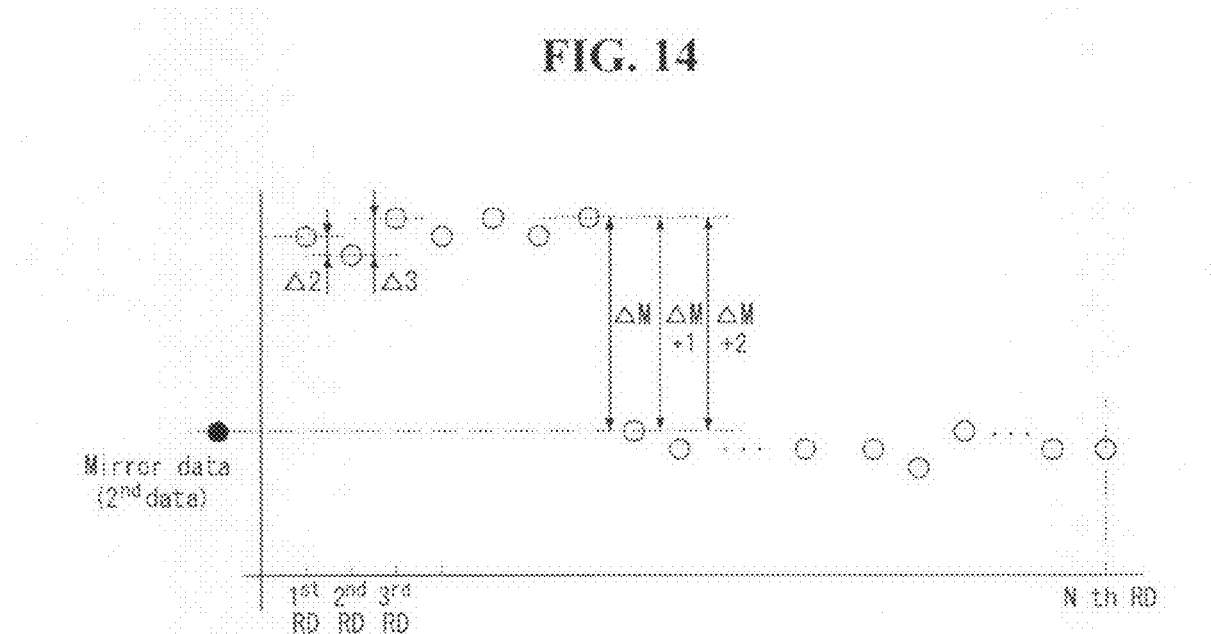

FIG. 16

|    | Δ1 | Δ2 | Δ3  | Δ4  | Δ5 | Δ6 | Δ7 | Δ8 |
|----|----|----|-----|-----|----|----|----|----|
| Y1 | 1  | 1  | 7   | 7   | 9  | -2 | 5  | 4  |
| Y2 | 2  | -2 | 127 | 138 | 63 | 16 | 9  | -3 |
| Y3 | -6 | 6  | 0   | 6   | 5  | 2  | 2  | 0  |
| Y4 | -2 | 2  | 6   | 7   | 0  | -1 | -1 | 4  |
| Y5 | -4 | 4  | 4   | 0   | -2 | 9  | 2  | 2  |
| Y6 | -5 | 5  | -2  | 5   | 4  | 2  | -5 | 5  |

FIG. 17

|    | 1   | 2   | 3   | 4   | 5   | 6   | 7   | 8   |
|----|-----|-----|-----|-----|-----|-----|-----|-----|
| Y1 | 513 | 511 | 519 | 519 | 521 | 510 | 517 | 516 |
| Y2 | 514 | 510 | 639 | 650 | 575 | 528 | 521 | 509 |
| Y3 | 506 | 518 | 512 | 518 | 517 | 514 | 514 | 512 |
| Y4 | 510 | 514 | 518 | 519 | 512 | 511 | 511 | 516 |
| Y5 | 508 | 516 | 516 | 512 | 510 | 521 | 514 | 514 |
| Y6 | 507 | 517 | 510 | 517 | 516 | 514 | 507 | 517 |

TOUCH SENSING DEVICE AND METHOD FOR CORRECTING OUTPUT THEREOF

This application claims the benefit of Korean Patent Application No. 10-2008-099708 filed on Oct. 10, 2008, which is hereby incorporated by reference for all purposes as if fully set forth herein.

BACKGROUND OF THE INVENTION

1. Field of the Invention

This document relates to a touch sensing device and a method for correcting an output thereof.

2. Discussion of the Related Art

Along with the trend of light weight and slim size of home electronic appliances and portable information devices, as a user input means, a button switch is being replaced with a touch sensor.

As the touch sensor, an electrostatic capacitance type, a resistor type, a pressure type, an optical type, an ultrasonic type, etc. are known. A touch screen is comprised of touch sensors formed on a display device.

The touch sensors formed on the display device are connected to a power line and coupled with signal lines of the display device. Due to this, much noise is mixed in outputs of the touch sensors. Further, even when there is no touch input, a large deviation exists between the outputs of the neighboring touch sensors. Such a deviation is referred to as a swing level of touch data. A touch signal processing circuit recognizes a touch when touch data having more than a predetermined threshold value is inputted to a sum of the swing level of the touch data and the noise. The more the noise and swing level of the touch data, the lower the sensitivity of the touch sensors. Particularly, the swing level has a larger effect on the sensitivity of the touch data than the noise has. Therefore, to increase the sensitivity of the touch sensors, the swing level of the touch data should be decreased.

The touch signal processing circuit can compare the previous frame data and the current frame data, and correct touch data according to the result of comparison. However, the cost of the touch signal processing circuit increases because frame memories are required.

SUMMARY OF THE INVENTION

Accordingly, the present invention is directed to a touch sensing device and method for correct the output thereof that substantially obviates one or more of the problems due to limitations and disadvantages of the related art.

An advantage of the present invention is to provide a touch sensing device, which can increase the sensitivity of a touch sensor, and a method for correcting an output thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch sensing device according to the present disclosure, includes: a touch sensor array including a plurality of touch sensors; and a swing level correction unit for correcting each of touch data from the touch sensor array by a difference value with neighboring another touch data to generate correction values and correcting the swing levels of the touch data by adding an offset value to the correction values.

The swing level correction unit generates mirror data by selecting any one of the touch data.

The swing level correction unit generates a correction value of first touch data by a difference value between the first touch data, among the touch data, obtained from the first touch sensor disposed at one tail end or the other tail end of the touch sensor array and the mirror data, and corrects the swing level of the first touch data by adding the offset value to the correction value of the first touch data.

The touch sensing device further comprises a touch signal processing circuit for converting a difference voltage between touch data voltages outputted from the touch sensors and a reference voltage into digital data to generate the touch data and supplying the digital data to the swing level correction unit.

The touch sensors are laminated on the display panel of the display device, inserted into the display panel, or incorporated within a pixel array of the display panel.

The display device includes any one of a liquid crystal display (LCD), a field emission display (FED), a plasma display panel (PDP), and an electroluminescence (EL) device.

In another aspect of the present invention, a method for correcting an output of the touch sensing device according to the present invention, includes: correcting each of touch data from a touch sensor array including a plurality of touch sensors by a difference value with neighboring another touch data to generate correction values; and correcting the swing levels of the touch data by adding an offset value to the correction values.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 11 to 14 are views showing an example of selection of mirror data;

FIG. 15 is a view showing one example of touch data (or raw data) before swing level correction;

FIG. 16 is a view showing correction values of touch data obtained by using mirror data and touch data;

FIG. 17 is a view showing swing level correction touch data calculated by adding an offset value to the correction values of FIG. 16;

DETAILED DESCRIPTION OF THE ILLUSTRATED EMBODIMENTS

Figure 1:
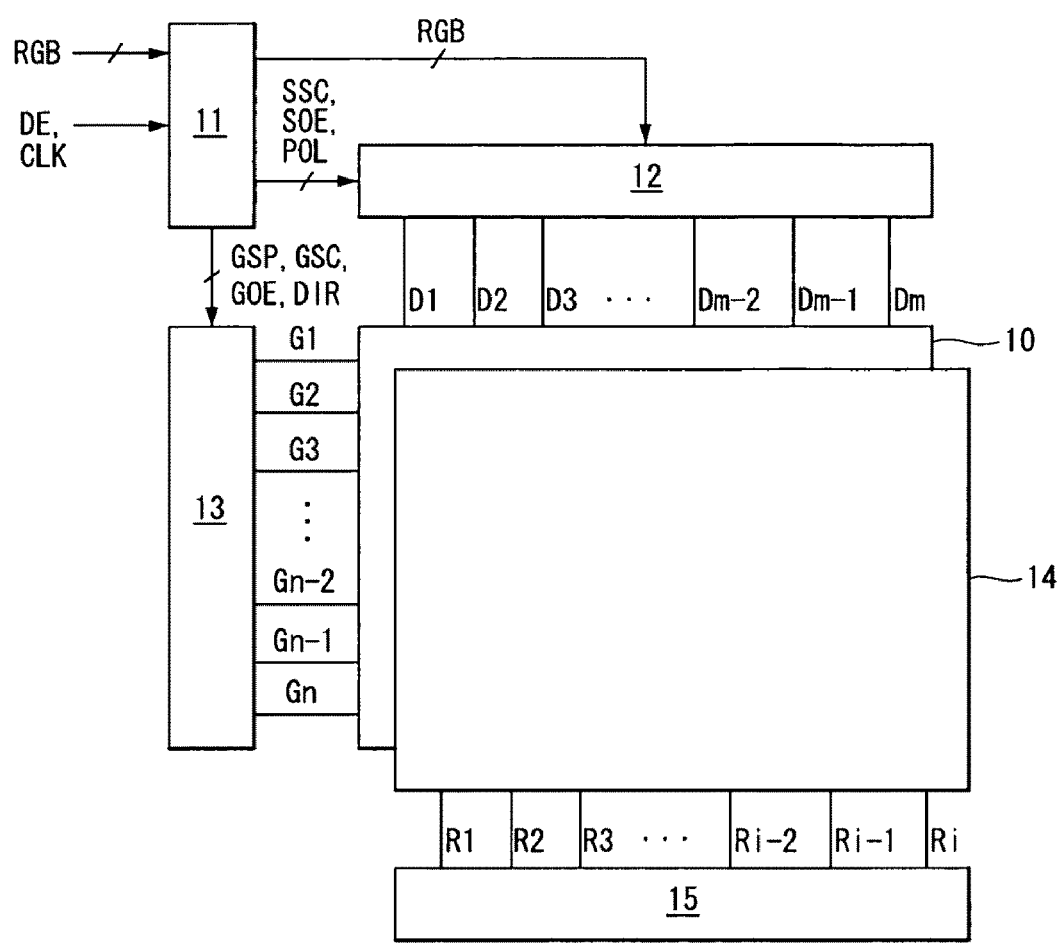
FIG. 1 is a block diagram showing a touch sensor and a display device according to an embodiment of the present disclosure.

Hereinafter, exemplary embodiments of the present disclosure will be described in detail with reference to FIGS. 1 to 20.

Referring to FIGS. 1 to 5, a touch sensor and a display device according to an embodiment of the present disclosure comprise a touch sensing device and a display device.

The touch sensing device comprises a touch sensor array 14 and a touch signal processing circuit 15 for processing an output signal of the touch sensor array 14. The touch sensor array 14 comprises a plurality of touch sensors connected to lead out lines R1 to Ri. As shown in FIGS. 1 to 4, the touch sensor array 14 may be laminated on a display panel 10 of the display device, inserted into the display panel 10, or formed within a pixel TFT array of the display panel 10 and integrated with the display panel 10. The touch signal processing circuit 15 supplies a driving voltage to the touch sensors of the touch sensor array 14 and converts a difference voltage between a touch data voltage outputted from the touch sensors via the lead out lines R1 to Ri and a reference voltage into digital data. The touch sensing device according to the embodiment of the present disclosure further comprises a touch data correction circuit for averaging the swing levels of touch data, eliminating noise mixed in the touch data, and then calculating a coordinate of the touch data. A detailed description of the touch data correction circuit will be described later.

The display device comprises a display panel 10, a data drive circuit 12, a scan drive circuit 13, and a timing controller 11. This display device can be implemented as flat panel displays, such as a liquid crystal display (LCD), a field emission display (FED), a plasma display panel (PDP), and an electroluminescence (EL) device. In the following embodiment, the display device will be explained focused on a liquid crystal display. The liquid crystal display may further comprise a backlight unit for irradiating light to the display panel 10. The backlight unit may be implemented as an edge type backlight unit in which a light source is disposed facing a side of a light guide plate and a direct type backlight unit in which light sources are disposed under a diffusion plate.

The display panel 10 includes a liquid crystal layer formed between two glass substrates. Formed on a lower glass substrate of the display panel 10 are a plurality of data lines D1 to Dm, a plurality of gate lines G1 to Gn crossing the data lines D1 to Dm, a plurality of TFTs (thin film transistors) formed at the crossings of the data lines D1 to Dm and the gate lines G1 to Gn, a plurality of pixel electrodes for charging liquid crystal cells with a data voltage, and a storage capacitor Cst connected to the pixel electrodes, for maintaining a voltage of the liquid crystal cells. The liquid crystal cells are disposed in a matrix form by the crossing of the data lines D1 to Dm and the gate lines G1 to Gn. Formed on the upper glass substrate of the display panel 10 area black matrix, color filters, and a common electrode. The common electrode is formed on the upper glass substrate in devices employing a vertical electric field driving method, such as a TN (Twisted Nematic) mode or a VA (Vertical Alignment) mode. Alternatively, the common electrode may be formed along with the pixel electrode on the lower glass substrate in devices employing a horizontal electric field driving method, such as an IPS (In-Plane Switching) mode or an FFS (Fringe Field Switching) mode. Polarizers are respectively applied to the upper glass substrate and the lower glass substrate of the display panel 10. Alignment films for setting the pre-tilt angle of liquid crystal are then formed in the internal surfaces of the respective polarizers which face the liquid crystal. A column spacer for maintaining a cell gap of the liquid crystal cells may be formed between the upper and lower glass substrates of the display panel.

The timing controller 11 receives timing signals such as a data enable signal DE and a dot clock (DCLK) signal, and generates control signals for controlling the operation timing of the data drive circuit 12 and the scan drive circuit 13. The control signals for controlling the scan drive circuit 13 include a gate start pulse GSP, a gate shift clock GSC, a gate output enable signal GOE, a shift direction control signal DIR, and the like. The control signals for controlling the data drive circuit 12 include a source sampling clock SSC, a polarity control signal POL a source output enable signal SOE, and the like. The timing controller 11 can generate the data drive circuit 12 and the scan drive circuit 13, and can generate a control signal for controlling the input/output operation timing of the touch signal processing circuit 15 to control the touch signal processing circuit 15.

The data drive circuit 12 includes a plurality of source drive IC (integrated circuits) and latches digital video data RGB under control of the timing controller 11. And, the data drive circuit 12 converts the digital video data RGB into an analog positive/negative gamma compensation voltage to generate a positive/negative pixel voltage, and supplies the voltage to the data lines D1 to Dm.

The scan drive circuit 13 includes one or more scan drive ICs and sequentially supplies scan pulses (or gate pulses) to the gate lines G1 to Gn.

Figure 2:
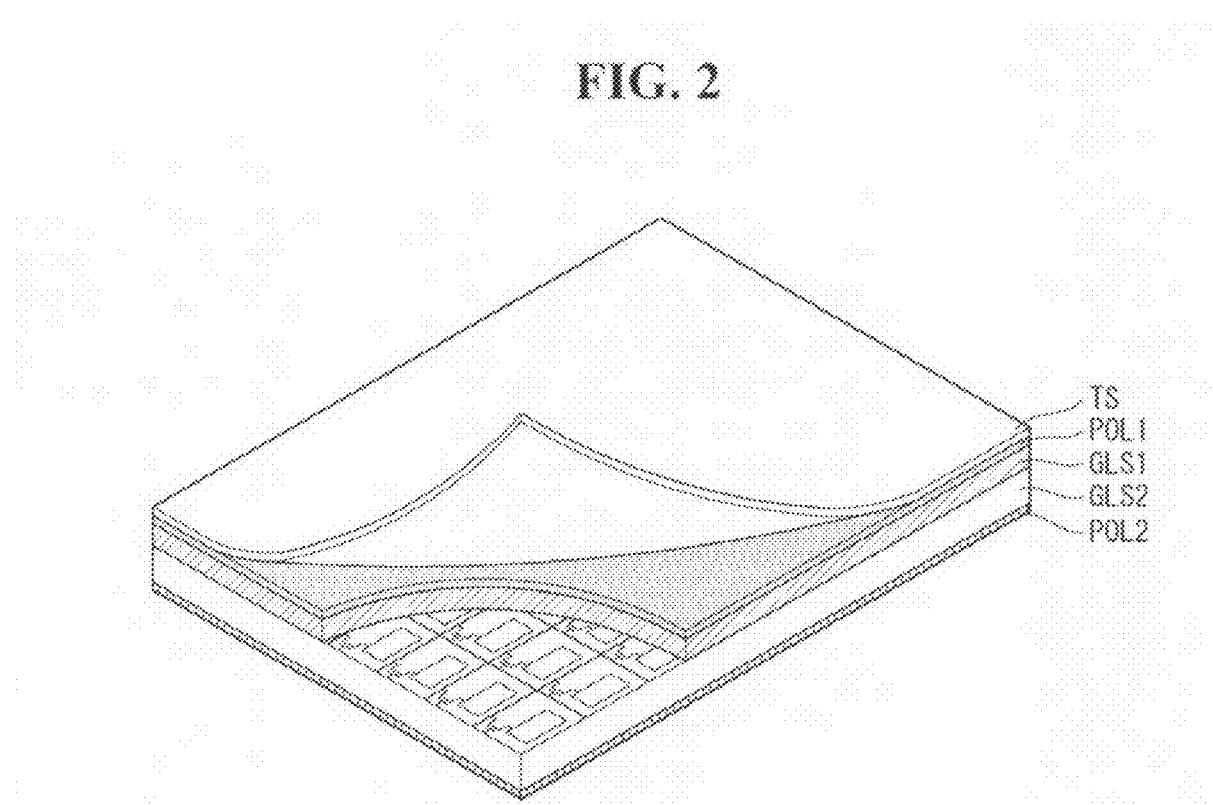
FIGS. 2 to 4 are views showing various embodiments of the touch sensor array and the display panel.
Figure 3:
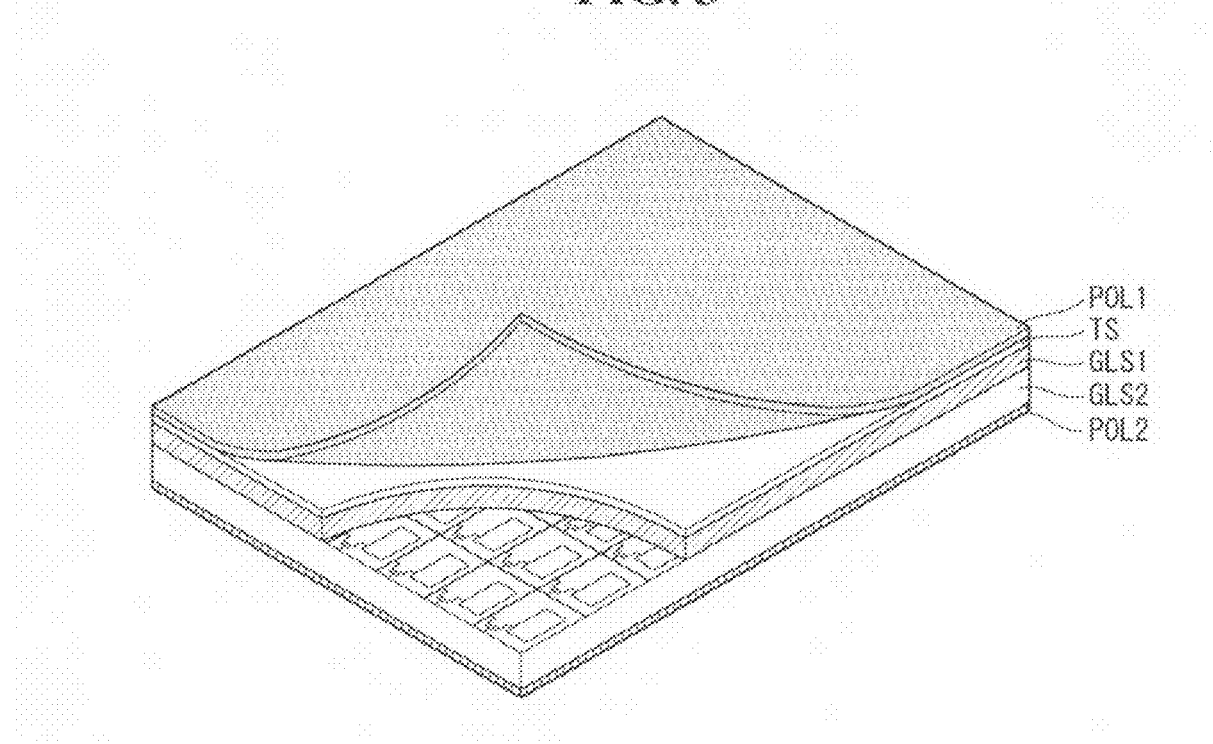
Figure 4:
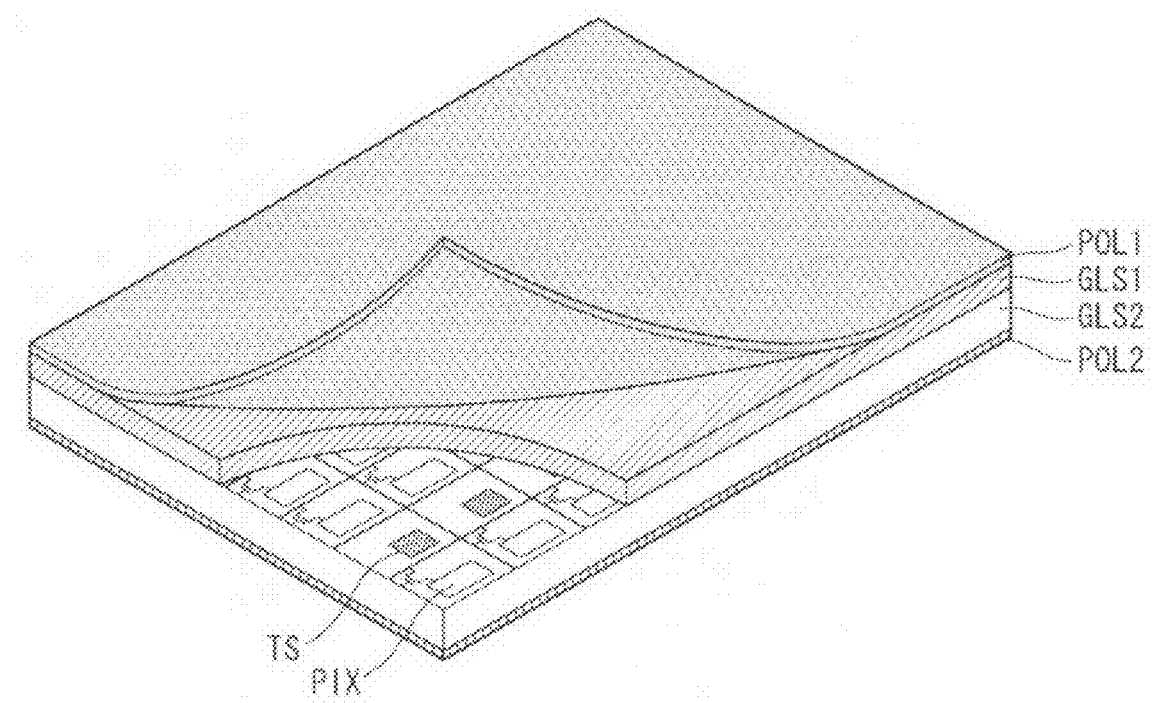

FIGS. 2 to 4 show various embodiments of the touch sensor array 14 and the display panel 10.

The display panel 10 includes an upper glass substrate GLS1 and a lower glass substrate GLS2 that are bonded together with a liquid crystal layer therebetween. An upper polarizer POL1 is attached to the upper glass substrate GLS1, and a lower polarizer POL2 is attached to the lower glass substrate GLS2.

As shown in FIG. 2, the touch sensor array 14 may comprise a touch sensor TS laminated on the upper polarizer POL1 of the display panel 10. Further, the touch sensor array 14 may be incorporated within the display panel 10 as shown in FIG. 3. For instance, the touch sensor array 14 may comprise a touch sensor TS sandwiched between the upper polarizer POL1 and the upper glass substrate GLS1. The touch sensor array 14 as shown in FIGS. 2 and 3 may be implemented in any one of a resistance film type touch sensor, an electrostatic capacitance type touch sensor, a surface elastic wave type touch sensor, and an ultraviolet ray type touch sensor.

As shown in FIG. 4, the touch sensor array 14 may comprise touch sensors TS that are formed within a pixel TFT array of the display panel 10. The pixel TFT array of the display panel 10 is formed on the lower glass substrate GLS2, and comprises data lines, gate lines, pixel switching TFTs, a pixel voltage maintaining storage capacitor, and pixel electrodes PIX of liquid crystal cells. The touch sensors TS of FIG. 4 may comprise a TFT formed simultaneously with the pixel switching TFTs of the pixel TFT array and a sensor voltage detecting capacitor to be formed simultaneously with the pixel voltage maintaining storage capacitor.

Figure 5:
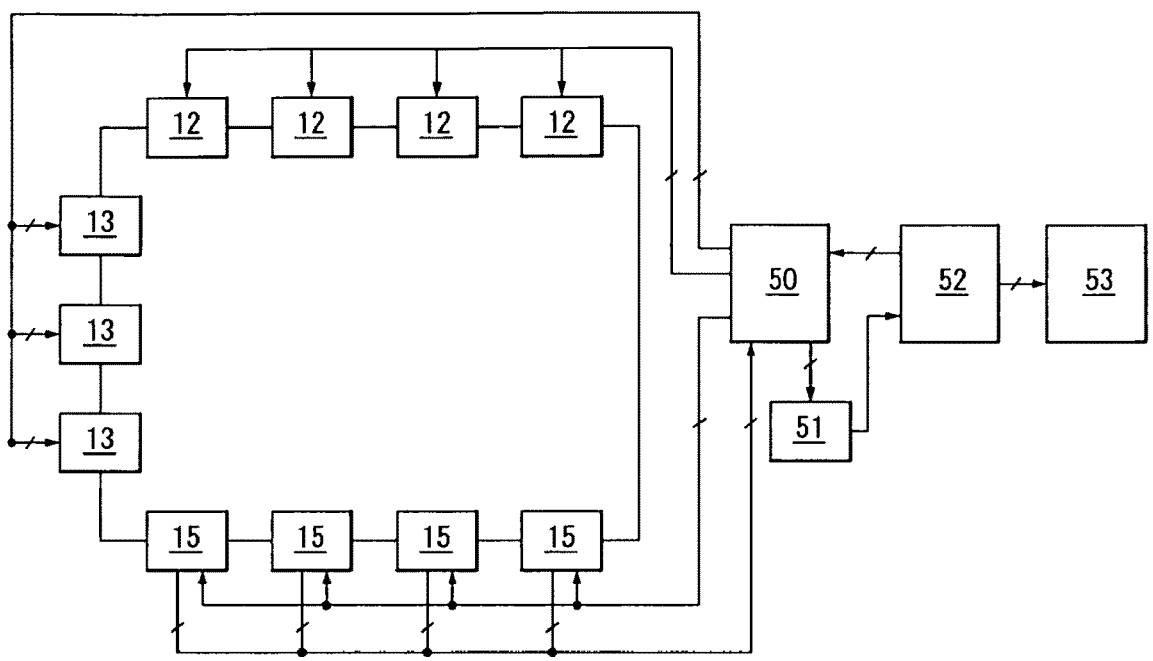
FIG. 5 is a view showing a touch data experimental apparatus connected the touch sensor and display device as shown in FIG. 1.
Figure 6:
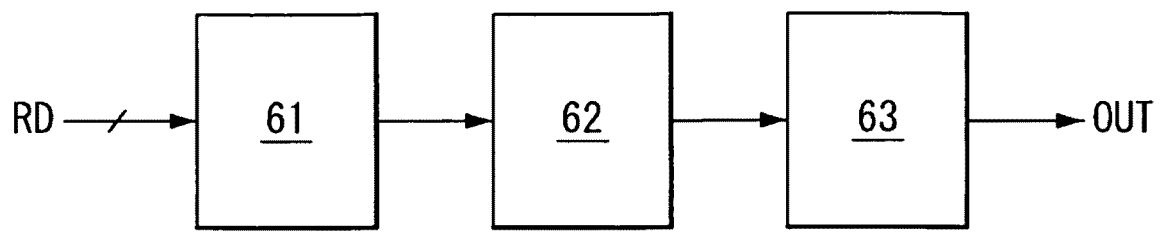
FIG. 6 is a block diagram showing a touch data correction circuit of a control board as shown in FIG. 5.

FIGS. 5 and 6 show a touch sensing device including a touch data correction circuit and a touch data experimental apparatus connected to the touch sensing device.

Referring to FIGS. 5 and 6, a control board 50 comprises a controller 11 and a touch data correction circuit. The timing controller 11 supplies digital video data to the data drive circuit 12, and controls the operation timings of the data drive circuit 12 and the scan drive circuit 13. Further, the timing controller 11 controls the operation timing of the touch signal processing circuit 15.

The touch data correction circuit comprises a swing level correction unit 61, a noise elimination unit 62, and a coordinate detection unit 63. The touch data correction unit may be separated from the control board 50 and incorporated in the touch signal processing circuit 15.

The swing level correction unit 61 selects mirror data among touch data outputted from the respective touch sensors. The swing level correction unit 61 calculates correction values of respective touch data by using mirror data and touch data, and averages the swing levels of the touch data by reducing them. A predetermined offset value may be added to the touch data whose swing levels are corrected. The offset value is a positive integer, and may be determined experimentally and adjusted according to a touch sensitivity setting.

The noise elimination unit 62 eliminates noise mixed in touch data by using a well-known noise elimination algorithm. The coordinate detection unit 63 detects, as touch data of a valid touch point, touch data having more than a predetermined threshold value among the touch data that has undergone swing level correction and noise elimination, and calculates x and y coordinates of the touch data.

The touch data experimental apparatus comprises an interface board 51 connected to the control board 50, a computer 52, and a monitor 53. The touch data experimental apparatus is an apparatus for checking the operation and sensitivity of touch sensors with eyes by displaying outputs of the touch sensors as images. Accordingly, the touch data experimental apparatus can be separated from the control board 59 after the completion of the touch sensor and the display device. The interface board 51 connects the touch data and coordinates from the touch data correction circuit to the computer 52 by using an interface, such as an SPI (serial peripheral interface), RS232, I2C, etc. The interface board 51 is inserted into a PCI (peripheral component interconnect) slot of the computer 52. The computer 52 supplies the touch data inputted through the PCI slot to the monitor 53. The monitor 53 displays the touch data from the computer 52.

Figure 7:
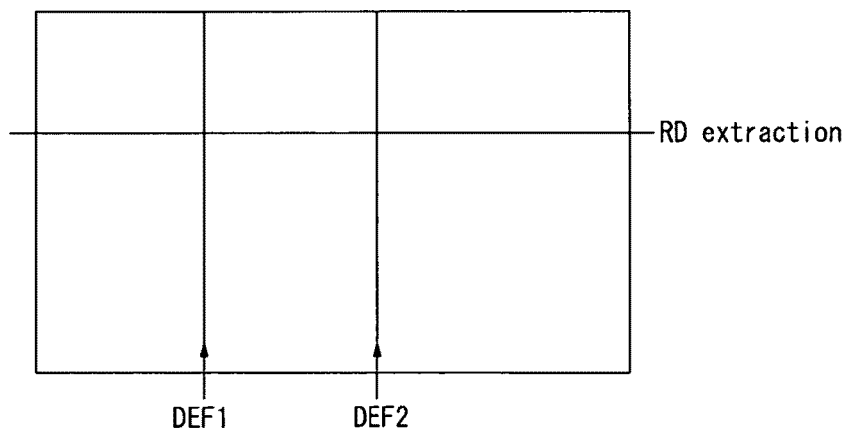
FIG. 7 is a photograph showing one example of touch data displayed on a monitor shown in FIG. 6.
Figure 8:
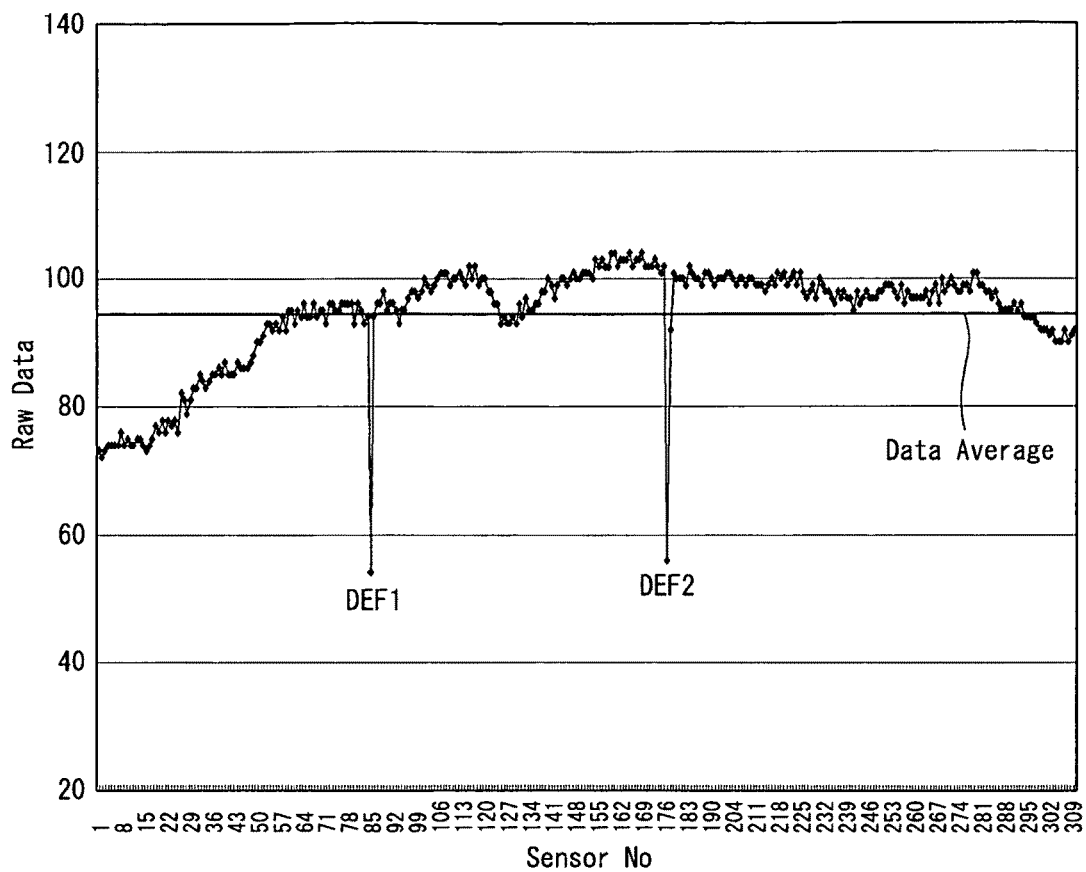
FIG. 8 is a graph showing touch data before swing level correction that is extracted from an RD extraction line as shown in FIG. 7.

FIGS. 7 and 8 are views showing touch data RD before swing level correction. These touch data RD are simultaneously extracted from an RD extraction line as shown in FIG. 7.

Referring to FIGS. 7 and 8, the outputs of the touch sensors are not consistent due to the effect of the display panel or the nonuniformity of devices as shown in FIG. 8. In an example of FIG. 8, a swing level width between the lowest touch data RD and the highest touch data RD is approximately more than 30. When the user gently touches the touch sensor array 14, outputs of the touch sensors of the touch region may be produced within the swing level width. In this case, the touch is not recognized. In FIGS. 7 and 8, "DEF1" and "DEF2" are defect lines where the outputs of the touch sensors are not normal.

Figure 9:
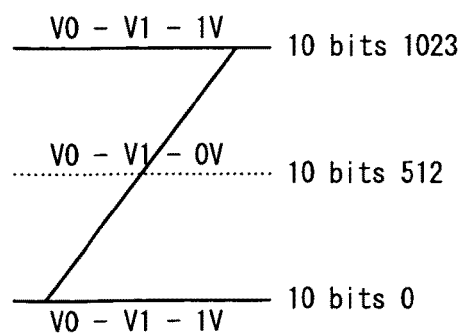
FIG. 9 is a view showing touch data voltages and digital values.
Figure 10:
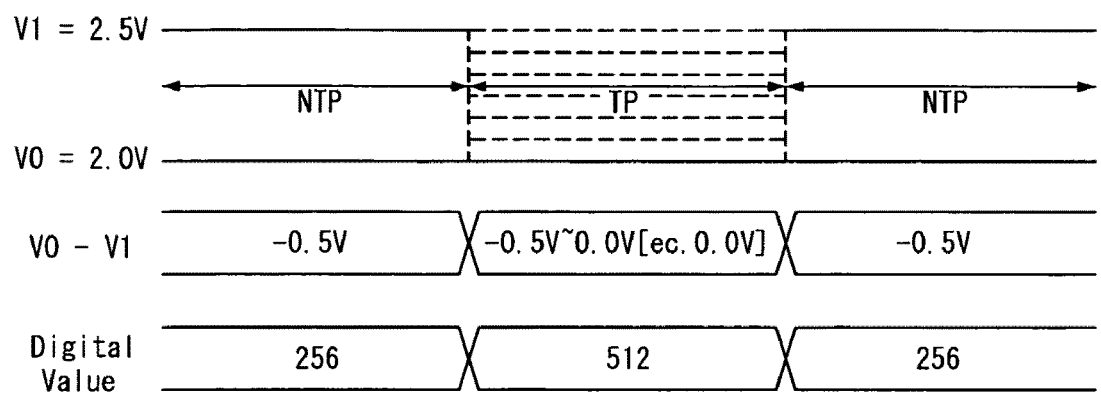
FIG. 10 are views showing a touch data voltage and digital value of a touch region and a touch data voltage and digital value of a non-touch region.

FIGS. 9 and 10 are views showing a touch data change on the touch sensor array 14 in a non-touch period NTP where there is no touch input and in a touch period TP where a touch input is generated.

Referring to FIGS. 9 and 10, the touch signal processing circuit 15 converts a difference voltage V0-V1 between a predetermined reference voltage V0 and a touch sensor output voltage V1 into digital data and generates touch data. During the non-touch period NTP, if the reference voltage V0 is 2.0V and the touch sensor output voltage V1 is 2.5V, the touch signal processing circuit 15 converts the difference voltage V0-V1 of −0.05V into a digital value of '256' and generates a touch sensor output. During the non-touch period, the touch sensor output voltage V1 is varied according to a touch pressure, thus the touch signal processing circuit 15 converts the difference voltage V0-V1 ranging from −0.5V to 0.0V is converted into a digital value ranging from 256 to 512 and generates it as a touch sensor output.

FIGS. 11 to 14 are views schematically showing a mirror data generation method for the swing level correction unit 61. Mirror data is selected among the touch data of the touch sensor array 14. This mirror data is pseudo data that is to be subtracted with the touch data outputted from a tail end touch sensor positioned at one tail end or the other tail end of the touch sensor array 14.

The mirror data is selected from the touch data simultaneously outputted from the RD extraction line of FIG. 7, considering the following 4 cases. The touch signal processing circuit 15 generates a difference voltage between the voltage V1 of the touch data 1th RD, 2nd RD . . . Nth RD simultaneously inputted from the RD extraction line and a predetermined reference voltage V0, and converts the difference voltage into digital data by using an analog-to-digital convertor.

Figure 11:
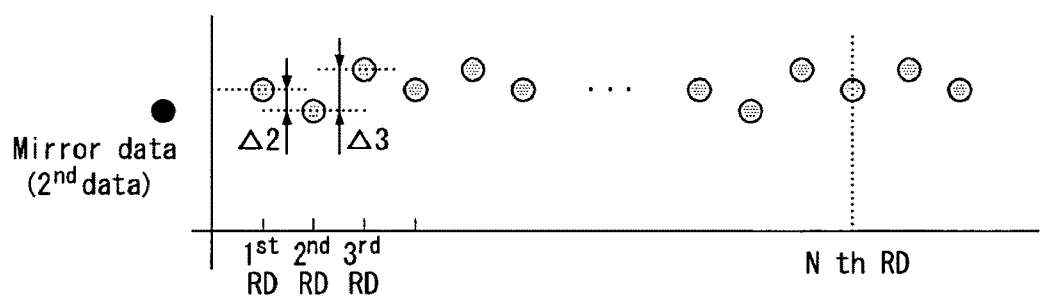

Case 1 (FIG. 11)

When 2nd RD−1st RD=Δ2, 3rd RD−2nd RD=Δ3, . . . N(N is a positive integer)th RD−(N−1)th RD=ΔN, if all of Δ2, Δ3 . . . ΔN do not exceed a predetermined critical value as shown in FIG. 11, the swing level correction unit 61 selects, as mirror data, 2nd RD whose external condition is most similar to that of 1st RD. The predetermined critical value is a positive integer that is experimentally obtained. The "1st RD" is first touch data outputted from the first touch sensor existing at the leftmost side of the RD extraction line of FIG. 7, the "2nd RD" is second touch data outputted from the second touch sensor neighboring to the right side of the first touch sensor, and "Nth RD" is N-th touch data outputted from the N-th touch sensor.

Figure 12:
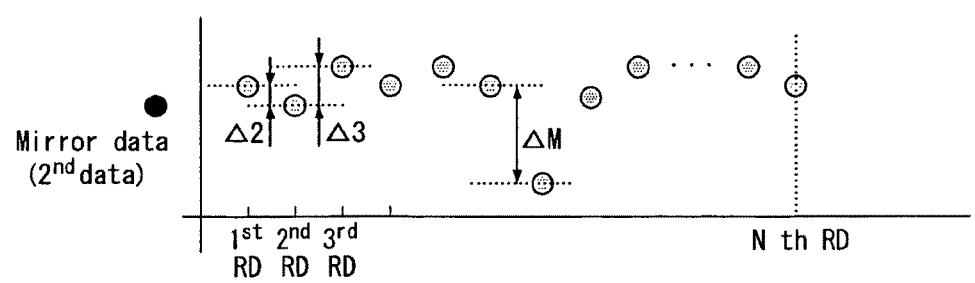

Case 1 (FIG. 12)

When 2nd RD−1st RD=Δ2, 3rd RD−2nd RD=Δ3, . . . M(M is a positive integer smaller than N)th RD−(M−1)th RD= ΔM . . . Nth RD−(N−1)th RD=ΔN, if there exists any difference value, such as ΔM, exceeding a predetermined critical value, the swing level correction unit 61 compares the number of difference values exceeding the critical value with an allowable reference number. As a result of comparison, if the number of references exceeding the critical value is less than the allowable reference number, the swing level correction unit 61 ignores the difference values exceeding the critical value, and selects, as mirror data, 2nd RD whose external condition is most similar to that of 1st RD among the touch data of less than the critical value. The critical value and the allowable reference number are positive integers that are respectively determined experimentally and are variable according to the touch sensors existing on the RD extraction line or the sensitivity setting of the touch sensors.

Figure 13:
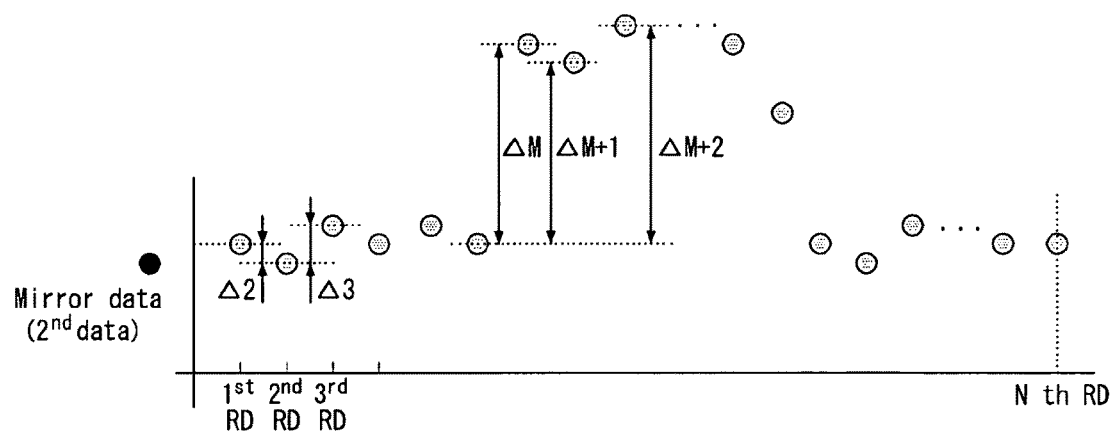

Case 3 (FIG. 13)

When 2nd RD−1st RD=Δ2, 3rd RD−2nd RD=Δ3, . . . Mth RD−(M−1)th RD=ΔM, (M+1)th RD−(M−1)th RD=ΔM+1, (M+2)th RD−(M−1)th RD=ΔM+2, . . . Nth RD−(N−1)th RD=ΔN, if there exists a plurality of consecutive difference values, such as ΔM, ΔM+1, and ΔM+2, exceeding a predetermined critical value, the swing level correction unit 61 compares the number of difference values exceeding the critical value with an allowable reference number. As a result of comparison, if the number of references exceeding the critical value is less than the allowable reference number, the swing level correction unit 61 ignores the difference values exceeding the critical value, and selects, as mirror data, 2nd RD whose external condition is most similar to that of 1st RD among the touch data of less than the critical value. In this case, no touch region is recognized because the number of consecutive touch data of more than the critical value is small.

Case (FIG. 14)

When 2nd RD−1st RD=Δ2, 3rd RD−2nd RD=Δ3, . . . Mth RD−(M−1)th RD=ΔM, (M+1)th RD−(M−1)th RD=ΔM+1, (M+2)th RD−(M−1)th RD=ΔM+2, . . . Nth RD−(N−1)th RD=ΔN, if there exists a plurality of consecutive difference values, such as ΔM, ΔM+1, and ΔM+2, having a negative deviation and exceeding a predetermined critical value, the swing level correction unit 61 compares the number of difference values exceeding the critical value with an allowable reference number. As a result of comparison, if the number of references exceeding the critical value is more than the allowable reference number, the swing level correction unit 61 recognizes the vicinity of the first touch sensor not exceeding the critical value as a touch region where an actual touch input has occurred, and selects, as mirror data, (M+1)th RD whose external condition is most similar to that of 1st RD among the consecutive difference values having a negative deviation while exceeding the critical value.

FIG. 15 is one example of touch data (X1 to X8) generated from the touch sensors of lines X1 to X6 (RD extraction lines) when a touch input has occurred in touch regions X3 to X5 of the touch sensor array 14. The leftmost columns of FIG. 15 represent mirror data MD selected among the touch data on the basis of the method as shown in FIGS. 11 to 14.

The swing level correction unit 61 calculates a correction value ΔC1 of first touch data X1 as ΔC1=X1−MD in each of the lines Y1 to Y6, and calculates correction values ΔCN of the other touch data X2 to X8 as ΔCN=X(N)−(XN−1). FIG. 16 shows correction values ΔC1 and ΔCN of the respective touch data of FIG. 15.

The swing level correction unit 61 adds an offset of "512" to the correction values ΔC1 and ΔCN of FIG. 16. The result of addition of the offset to the respective correction values ΔC1 and ΔCN is as shown in FIG. 17.

Figure 18:
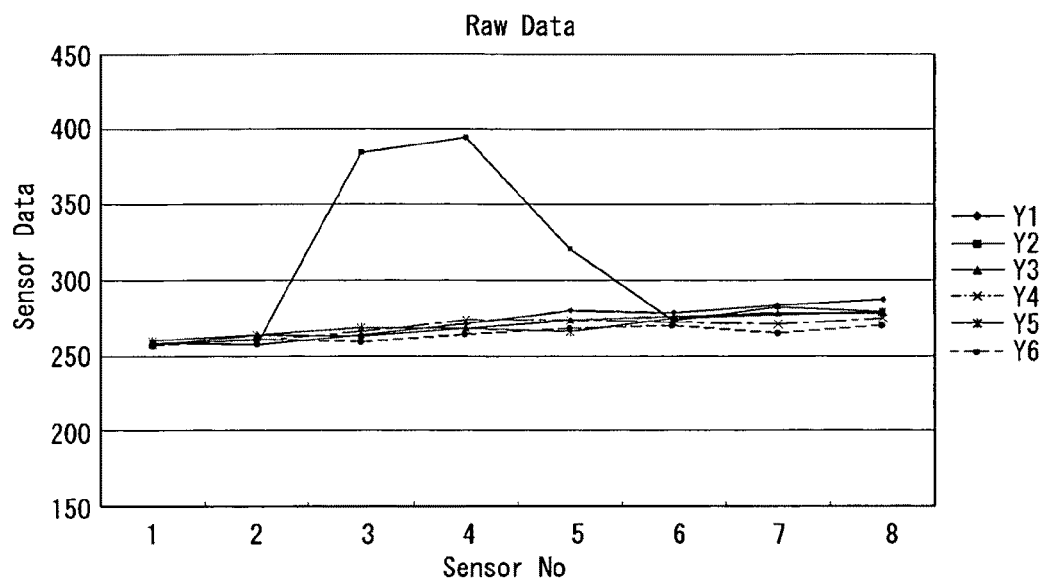
FIG. 18 is a graph showing the data before swing level correction of FIG. 15.
Figure 19:
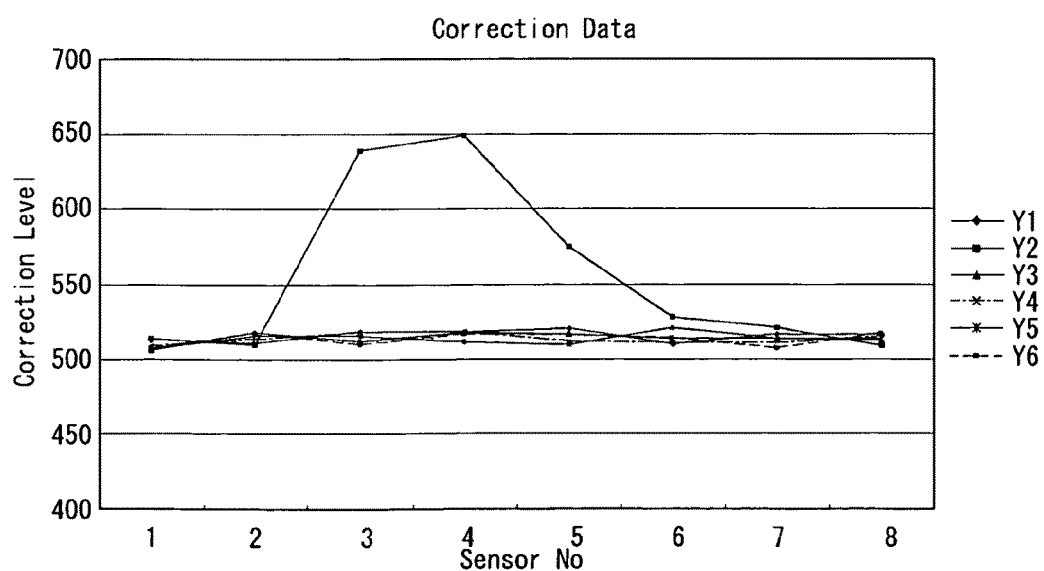
FIG. 19 is a graph showing the data after swing level correction of FIG. 17.

FIG. 18 is a graph showing the touch data before swing level correction of FIG. 15. FIG. 19 is a graph showing the data after swing level correction of FIG. 17.

As shown in FIG. 18, as the touch data before swing level correction goes further to the right among the touch sensors of the RD extraction lines, the swing levels increase. On the contrary, as a result of correcting each touch data by a difference value with mirror data or neighboring touch data by the swing level correction unit 61 and then adding an offset value to the correction values, the touch data is averaged by the touch sensors of the RD extraction lines as shown in FIG. 19. In FIG. 19, a touch can be recognized because touch data of a touch region is not lost. Therefore, due to swing level correction, the touch sensing device of this disclosure can increase the touch sensitivity and the reliability of the touch sensors.

Figure 20:
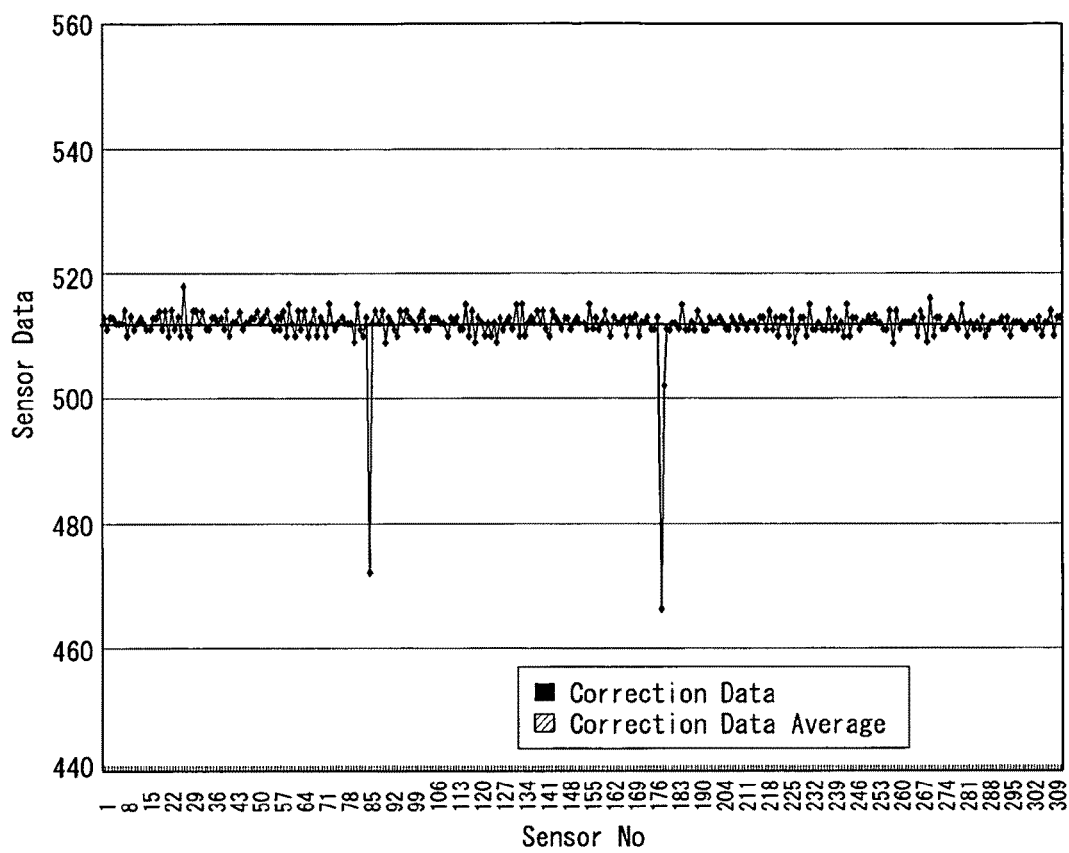
FIG. 20 is a graph showing a result of averaging the swing levels of the touch data as shown in FIG. 8 by the aforementioned swing level correction method.

FIG. 20 is a graph showing a result of averaging the swing levels of the touch data as shown in FIG. 8 by the aforementioned swing level correction method. As can be clearly seen from FIGS. 8 to 20, the swing levels of touch data are averaged by swing level correction.

As described above, the touch sensing device and method for correcting an output thereof according to the embodiments of the present disclosure can increase touch sensitivity by correcting each of touch data by a difference value with neighboring another touch data to generate correction values and correcting the swing levels of touch data by adding an offset value to the correction values.

From above-describe details, those skilled in the art will appreciate that various changes and modifications are possible without departing from the technical spirit of the invention. Accordingly, the scope of the invention must not be limited to only details of the above-described embodiment, but defined by the claims.

What is claimed is:

1. A touch sensing device, comprising:
    a touch sensor array including a plurality of touch sensors; and
    a swing level correction unit for generating correction values by subtracting each of touch data from the touch sensor array with neighboring another touch data, and for correcting the swing levels of the touch data by adding an offset value to the correction values.

2. The touch sensing device of claim 1, wherein the swing level correction unit generates mirror data by selecting any one of the touch data.

3. The touch sensing device of claim 2, wherein the swing level correction unit generates a correction value of first touch data by subtracting a first touch data, obtained from the first touch sensor disposed at one tail end or the other tail end of the touch sensor array with the mirror data.

4. The touch sensing device of claim 3, further comprising a touch signal processing circuit for converting a difference voltage between touch data voltages outputted from the touch sensors and a reference voltage into digital data to generate the touch data and supplying the digital data to the swing level correction unit.

5. The touch sensing device of claim 1, wherein the touch sensors are laminated on the display panel of the display device, inserted into the display panel, or incorporated within a pixel array of the display panel.

6. The touch sensing device of claim 1, wherein the display device includes any one of a liquid crystal display (LCD), a field emission display (FED), a plasma display panel (PDP), and an electroluminescence (EL) device.

7. A method for correcting an output of the touch sensing device, comprising:
    generating correction values by subtracting each of touch data from the touch sensor array with neighboring another touch data; and
    correcting the swing levels of the touch data by adding an offset value to the correction values.

8. The method of claim 7, further comprising selecting any one of the touch data to generate a mirror data.

9. The method of claim 8, further comprising:
    generating a correction value of first touch data by subtracting a first touch data obtained from the first touch sensor disposed at one tail end or the other tail end of the touch sensor array with the mirror data.

10. The method of claim 9, further comprising converting a difference voltage between touch data voltages outputted from the touch sensors and a reference voltage into digital data to generate the touch data.

11. The touch sensing device of claim 2, wherein the mirror data is pseudo data that is to be subtracted with the touch data outputted from a tail end touch sensor positioned at one tail end or the other tail end of the touch sensor array.

12. The method of claim 8, wherein the mirror data is pseudo data that is to be subtracted with the touch data outputted from a tail end touch sensor positioned at one tail end or the other tail end of the touch sensor array.

* * * * *

UNITED STATES PATENT AND TRADEMARK OFFICE
CERTIFICATE OF CORRECTION

| | | |
|---|---|---|
| PATENT NO. | : 8,179,374 B2 | Page 1 of 1 |
| APPLICATION NO. | : 12/318319 | |
| DATED | : May 15, 2012 | |
| INVENTOR(S) | : Suhyuk Jang | |

It is certified that error appears in the above-identified patent and that said Letters Patent is hereby corrected as shown below:

On the Title page of the Patent, under item (75), please correct the inventor's name to Suhyuk Jang.

Signed and Sealed this
Twenty-sixth Day of June, 2012

David J. Kappos
*Director of the United States Patent and Trademark Office*